United States Patent
Hayutin et al.

(10) Patent No.: US 8,074,063 B2
(45) Date of Patent: Dec. 6, 2011

(54) ENHANCED CAPABILITIES IN PROVISIONING

(75) Inventors: Wes David Hayutin, Raleigh, NC (US); Bradford E. Hinson, Raleigh, NC (US); Brandon D. Perkins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 628 days.

(21) Appl. No.: 12/201,412

(22) Filed: Aug. 29, 2008

(65) Prior Publication Data
US 2010/0058043 A1  Mar. 4, 2010

(51) Int. Cl.
*G06F 9/00* (2006.01)
*G06F 15/177* (2006.01)
*G06F 9/445* (2006.01)

(52) U.S. Cl. .............. 713/2; 713/1; 713/100; 709/220; 717/171; 717/176

(58) Field of Classification Search .......... 713/1, 2, 713/100; 709/220; 717/171, 176
See application file for complete search history.

(56) References Cited

U.S. PATENT DOCUMENTS

| | | | |
|---|---|---|---|
| 6,539,473 B1 * | 3/2003 | Hubacher et al. | 713/2 |
| 7,376,823 B2 * | 5/2008 | Iszlai et al. | 713/1 |
| 7,600,005 B2 * | 10/2009 | Jamkhedkar et al. | 709/220 |
| 7,788,477 B1 * | 8/2010 | Huang et al. | 713/2 |
| 2006/0294515 A1 * | 12/2006 | Gimpl et al. | 717/174 |

OTHER PUBLICATIONS

PowerPC, Wikipedia, Jan. 8, 2004.*
IBM System z, Wikipedia, Sep. 13, 2006.*

* cited by examiner

Primary Examiner — Stefan Stoynov
(74) Attorney, Agent, or Firm — Lowenstein Sandler PC (57) ABSTRACT

Some embodiments of enhanced capabilities in provisioning on computing machines in a networked system have been presented. In one embodiment, a software vendor deploys a centralized server to an internal network of a customer. The provisioning capabilities of a centralized server are extended to support an additional type of platform by downloading a set of kickstart files associated with the additional type of platform from a software vendor. The centralized server may provision on a computing machine coupled to the centralized server within the internal network based on a type of a platform of the computing machine using one or more of the plurality of kickstart files.

17 Claims, 5 Drawing Sheets

ENHANCED CAPABILITIES IN PROVISIONING

TECHNICAL FIELD

Embodiments of the present invention relate to provisioning computing machines in a networked environment, and more specifically to extending provisioning capabilities to multiple platforms.

BACKGROUND

Currently, a software vendor may deploy a conventional server to a customer's internal network to manage and to maintain software (e.g., operating system) licensed to the customer. Typically, the conventional server may provision on a predetermined set of platforms, including i386, x86_64, and IA-64 platforms, on computing machines within the internal network. However, the conventional server cannot provision a computing machine if a platform of the computing machine is not one of the above supported platforms.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of enhanced capabilities in provisioning on computing machines in a networked system. Note that to provision on a computing machine is sometimes referred to as to kickstart the computing machine. Thus, the term "provisioning" and "kickstart" may be used interchangeably throughout the current description. In one embodiment, a software vendor deploys a centralized server to an internal network of a customer, where the centralized server may manage and maintain software (e.g., operating system) licensed to the customer. The provisioning capabilities of a centralized server are extended to support an additional type of platform by downloading a set of kickstart files associated with the additional type of platform from a software vendor. The centralized server may provision on a computing machine coupled to the centralized server within the internal network based on a type of a platform of the computing machine. If the platform is of the additional type, then the centralized server may provision on the platform using one or more of the plurality of kickstart files.

With the implementation of the above operations, a method is created for storing various kickstart files, such as kickstart configuration files, kickstart data files (e.g., data files for the operating system), and kickstart operation files (e.g., files installed on the computing machine before the kickstart to set up the computing machine for provisioning), on the centralized server deployed to the customer's internal network. The mechanisms then allow these centrally stored kickstart files to be installed on computing machines within the internal network if the computing machines have the supported types of platforms (e.g., Power Personal Computer (PPC), System z, etc.). The computing machines may further be re-provisioned from centralized applications on the centralized server. More details of some embodiments of a method to extend the provisioning capabilities of the centralized server are discussed below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
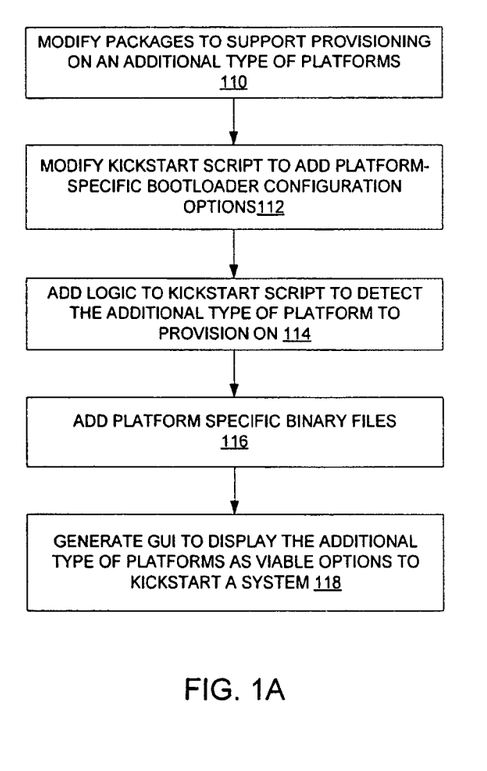
FIG. 1A illustrates one embodiment of a method to extend provisioning capabilities of a centralized server to support an additional platform.

FIG. 1A illustrates one embodiment of a method to extend provisioning capabilities of a centralized server to support an additional platform. The method may be performed by processing logic that may comprise hardware (e.g., circuitry, dedicated logic, programmable logic, microcode, etc.), software (such as instructions run on a processing device), firmware, or a combination thereof. For example, the processing module 215 of the centralized server 200 shown in FIG. 2 may perform at least part of the method.

Initially, software packages on a centralized server are modified to support provisioning on the additional platform (e.g., PPC, System z, etc.) (processing block 110). Then processing logic modifies a kickstart script on the centralized server to add bootloader configuration options specific to the additional platform (processing block 112). A bootloader as used herein broadly refers to the code executed prior to running an operating system on a computing machine. Typically, each type of platforms has its own platform-specific bootloader. For example, Yaboot is a bootloader for PPC, and ZIPL is a bootloader for System z. In some embodiments, the kickstart script is written in Python. The kickstart script may be written in other programming languages in different embodiments. Furthermore, logic is added to the kickstart script to detect the additional platform to provision (processing block 114). In one embodiment, where PPC is supported, processing logic may detect whether the computing machine has a PPC platform by checking for the existence of PPC specific files, such as /etc/yaboot.conf.

In some embodiments, processing logic downloads binary files specific to the additional platform to the centralized server (processing block 116). For example, the binary files may include the kernel and initrd images for PPC. Using the information gathered above, processing logic may pass the appropriate location of the images.

Finally, processing logic generates a graphical user interface (GUI) to display the additional type of platforms as one of the viable options to kickstart a system (processing block 118). With the above changes, processing logic may extend the provisioning capabilities of the centralized server to detect the additional type of platform to provision on, such as PPC. In some embodiment, once PPC has been detected, processing logic may pass the appropriate values to a tool for finding information about a current boot environment, such as Grubby.

To further illustrate the way to extend provisioning capabilities of a centralized server to support an additional platform, one embodiment of a method to extend provisioning capabilities of a centralized server to support a System z platform is discussed in detail below.

Figure 1B:
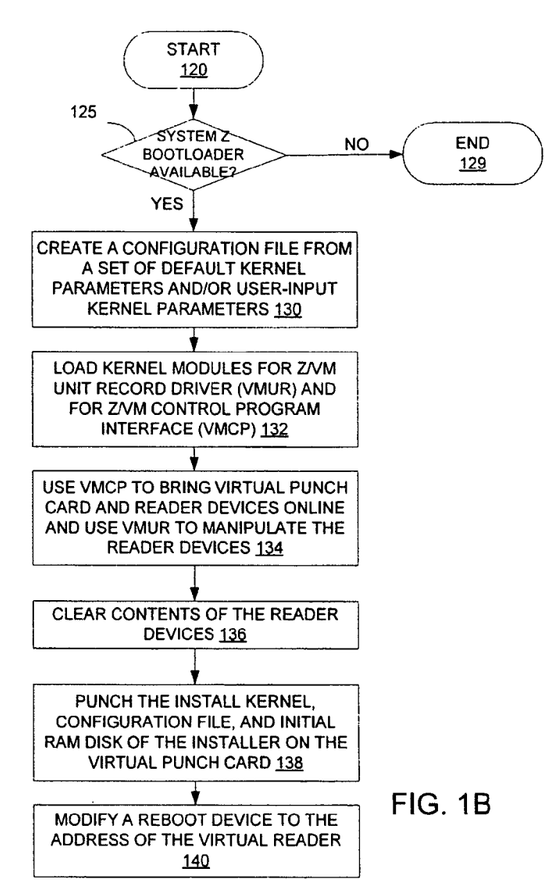
FIG. 1B illustrates one embodiment of a method to make a centralized server operable to provision on a System z platform.

FIG. 1B illustrates one embodiment of a method to make a centralized server operable to provision on a System z platform. The method may be performed by processing logic that may comprise hardware (e.g., circuitry, dedicated logic, programmable logic, microcode, etc.), software (such as instructions run on a processing device), firmware, or a combination thereof. For example, the processing module 215 of the centralized server 200 shown in FIG. 2 may perform at least part of the method.

The process starts at block 120. Processing logic determines if a System z bootloader is available (processing block 125). If the System z bootloader is unavailable, the process ends (processing block 129). Otherwise, processing logic creates a configuration file from a set of default kernel parameters and/or user-input kernel parameters (processing block 130). The user-input kernel parameters may be entered via some graphical user interfaces generated by the centralized server. The configuration file may be referred to as a PARM file in some embodiments. The configuration file is to be passed to an operating system installer (e.g., Red Hat Enterprise Linux installer). Then processing logic loads a kernel module for z/VM unit record driver (vmur) and a kernel module for z/VM control program interface (vmcp) (processing block 132). In some embodiments, processing logic uses a modprobe utility to load the kernel modules. The kernel module, vmur, allows a guest running under z/VM to access a virtual punch card device and a virtual reader. The kernel module, vmcp, allows a guest to access the z/VM control program layer from the Operating System (O/S), such as Linux.

In some embodiments, processing logic uses vmcp to bring the virtual punch card and virtual reader online, and uses vmur to manipulate the virtual reader (processing block 134). Processing logic then clears the contents of the virtual reader (processing block 136). Next, processing logic punches the install kernel, configuration file, and initial RAM disk of the installer on the virtual punch card (processing block 138).

Finally, processing logic modifies a reboot device (e.g., reIPL) to the address of the virtual reader (e.g., 0.0.000c) (processing block 140). Upon reboot, the guest may load the installation kernel and initial RAM disk, which in turn starts the provisioning process.

Figure 1C:
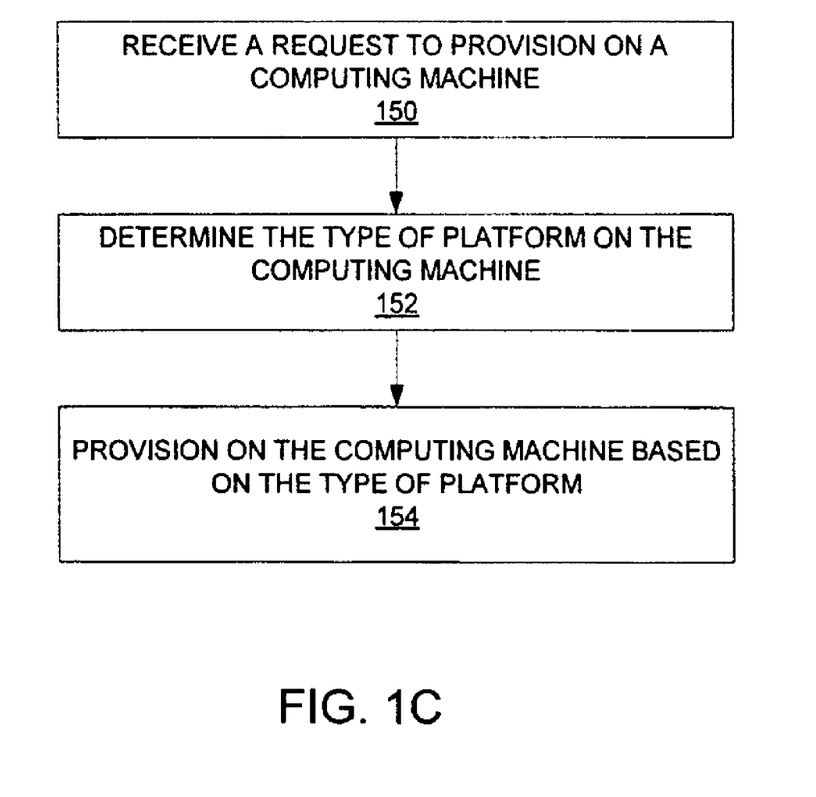
FIG. 1C illustrates one embodiment of a method to provision on a computing machine.

Once the provisioning capabilities of the centralized server have been extended as discussed above, the centralized server may provision on computing machines having the supported types of platforms. FIG. 1C illustrates one embodiment of a method to provision a computing machine. The method may be performed by processing logic that may comprise hardware (e.g., circuitry, dedicated logic, programmable logic, microcode, etc.), software (such as instructions run on a processing device), firmware, or a combination thereof. For example, the provisioning module 220 of the centralized server 200 shown in FIG. 2 may perform at least part of the method in response to executing a kickstart script.

Initially, processing logic in the centralized server receives a request to provision on a computing machine coupled to the centralized server in a networked system (processing block 150). Details of one embodiment of the centralized server and one embodiment of the networked system are discussed below with reference to Figures 2 and 3, respectively. Then processing logic determines what type of platform is on the computing machine (processing block 152). Based on the type of platform, processing logic provisions the computing machine (processing block 154).

Figure 2:
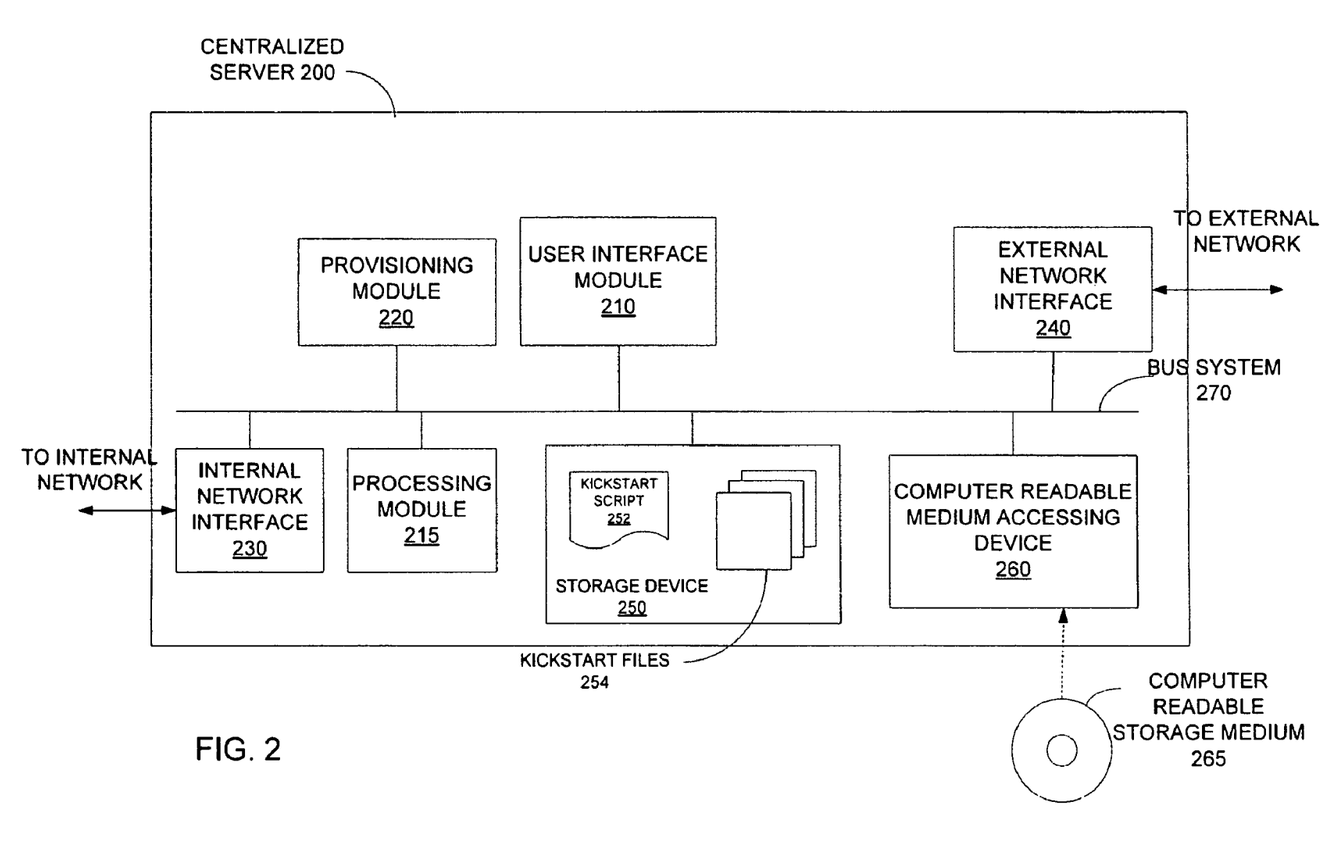
FIG. 2 illustrates a functional block diagram of one embodiment of a centralized server.

FIG. 2 illustrates a functional block diagram of one embodiment of a centralized server usable in a networked system in some embodiments. One embodiment of the networked system is discussed in detail below with reference to FIG. 3. Referring to FIG. 2, the centralized server 200 includes a user interface module 210, a processing module 215, a provisioning 220, an internal network interface 230, an external network interface 240, a storage device 250, and a computer-readable medium accessing device 260, which are coupled to each other via a bus system 270.

In some embodiments, the centralized server 200 is communicably coupled to an internal network of a customer of a software vendor via the internal network interface 230. The internal network further includes one or more physical computing machines of the customer, such as servers, workstations, desktop personal computers (PCs), laptops, mobile devices (e.g., personal digital assistants, cellular telephones, etc.), etc. The centralized server 200 is further coupled to an external network, such as the Internet, via the external network interface 240. The external network interface 240 may establish a secured connection to access an external server provided by the software vendor (such as the external server 370 in FIG. 3) to retrieve various contents from the external server, such as metadata of an operating system, kickstart files 254, application upgrades, etc. These contents retrieved may be stored or cached locally in the storage device 250 or on a storage device (e.g., a database) coupled to the centralized server 200 within the internal network.

Alternatively, the centralized server 200 may obtain the contents from the external server via a portable computer-readable storage medium 265 removably coupled to the computer-readable medium accessing device 260. Some examples of the computer-readable storage medium 265 and computer-readable storage medium accessing device 260 include a CD and a CD-ROM drive, a flash memory card with a Universal Serial Bus (USB) connector and a USB drive, etc. The external server of the software vendor may store the contents onto the computer-readable storage medium 265, which is then delivered to the customer for the centralized server's 200 use.

The centralized server 200 manages software licensed to the customer within the internal network. In some embodiments, the provisioning module 220 provisions on computing machines coupled to the centralized server 200 within the internal network. As discussed above, the provisioning module 220 may be limited to support some predetermined types of platforms on the computing machines. To extend the provisioning capabilities to support an additional type of platform (e.g., PPC, System z, etc.), processing module 215 may modify kickstart packages on the centralized server to support the additional type of platform. In some embodiments, a set of bootloader configuration options specific to the additional type of platform is added. Furthermore, the processing module 215 may modify a kickstart script 252 in the storage device 250 to enable the provisioning module 220 to detect the additional type of platform when executing the kickstart script 252. Kickstart files 254 specific to the additional platform (such as the kernel and initrd images for PPC) may be downloaded to the centralized server 200 via the external network interface 240 from the external server. In some embodiments, the kickstart files 254 include a kickstart configuration file, a kickstart data file, and/or a kickstart operation file. The kickstart files 254 downloaded are stored in the storage device 250. Finally, the processing module 215 may configure the bootloader options for the additional platform to ready a computing machine to be kickstarted. Details of some embodiments of a method to extend provisioning capabilities have been discussed above.

In some embodiments, the user interface module 210 generates a user interface (e.g., a graphical user interface, a text user interface, a command line interface, etc.) to allow users to input a provisioning request and the type of platform to provision. Moreover, a list of all viable platform options (e.g., PPC, System z, etc.) to provision a computing machine may be displayed in the user interface.

Once the provisioning capabilities of the centralized server 200 have been extended to support the additional type of platform, the provisioning module 220 may provision a computing machine having a supported type of platform in response to user requests. Details of one embodiment of a method to provision on a computing machine based on the type of platform of the computing machine have been discussed above.

Figure 3:
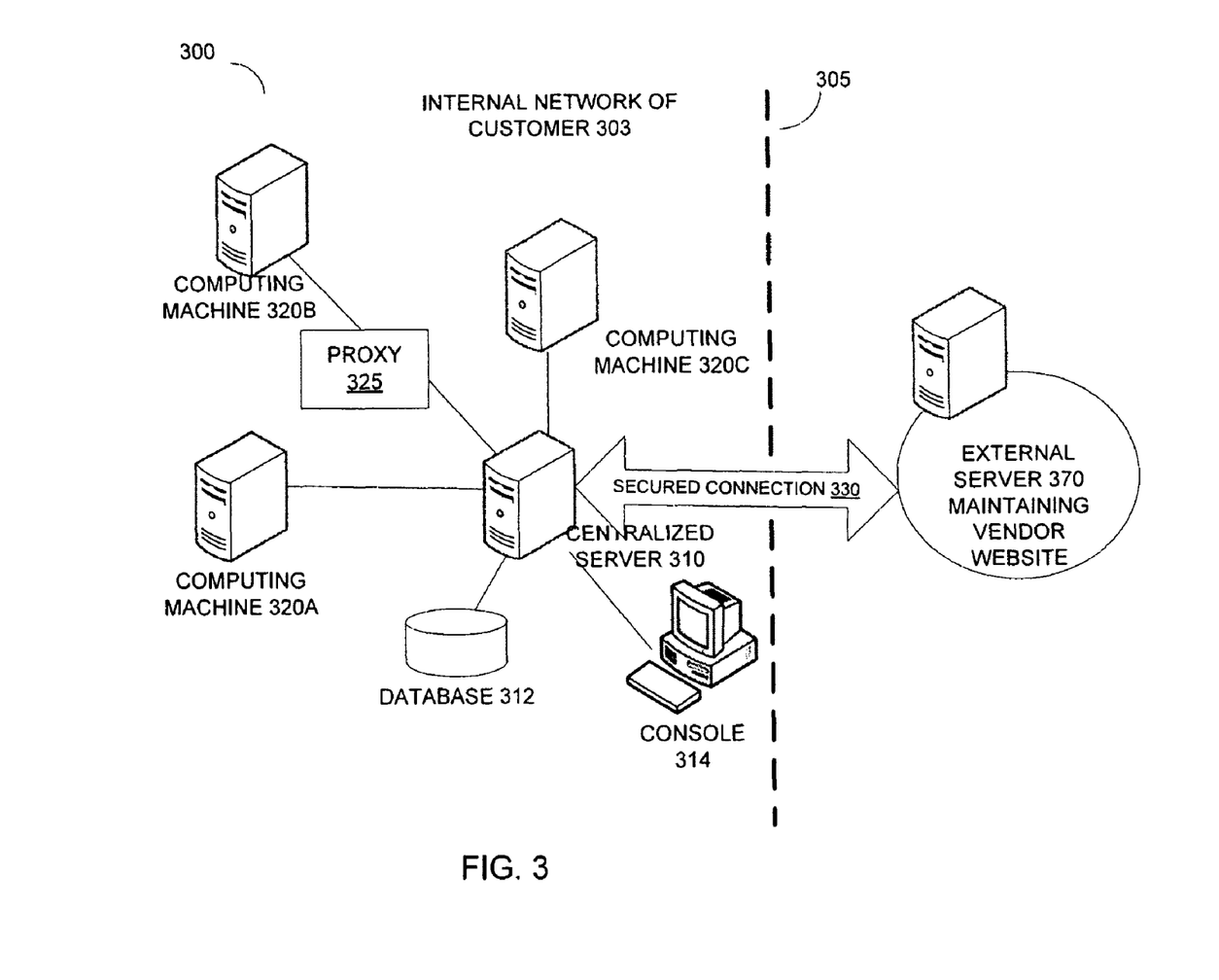
FIG. 3 illustrates one embodiment of a system in which embodiments of the present invention may be implemented.

FIG. 3 illustrates one embodiment of a system in which embodiments of the present invention may be implemented. The system 300 includes an external server 370 maintained by a software vendor and an internal network 303 of a customer of the software vendor, coupled to each other via a secured connection 330, such as a virtual private network (VPN) over a public network (e.g., the Internet). Thus, the system 300 may be referred to as a connected setup. Alternatively, the external server 370 and the internal network 303 may not be communicably coupled to each other. Rather, data and information may be loaded onto portable computer-readable storage media, such as compact discs (CDs), digital video disks (DVDs), flash memory cards with USB connectors, etc. The portable computer-readable storage media is then delivered to the customer's site to be loaded onto a centralized server within the internal network. As such, this system may be referred to as a disconnected setup.

In some embodiments, the internal network 303 of the customer further includes components shown on the left side of the dotted line 305. As illustrated in FIG. 3, the internal network 303 of the customer includes a centralized server 310, a number of computing machines 320A-320C, a database 312, and a console 314. The computing machines 320A-320C are physical hardware, such as servers, workstations, desktop personal computers (PCs), laptops, etc. The computing machines 320A-320C, the console 314, and the database 312 are coupled to the centralized server 310 within the internal network 303. In some embodiments, one or more of the customer's computing machines may be coupled to the centralized server 310 via a proxy, such as the proxy 325 between the computing machine 320B and the centralized server 310. The proxy 325 may cache software packages to enhance performance, speed up downloads, and offload some of the operations from the centralized server 310.

In some embodiments, the centralized server 310 manages software licensed to the customer within the internal network 303. The centralized server 310 may provision on the computing machines 320A-320C in response to user requests. Because the provisioning capabilities of the centralized server 310 is conventionally limited to some predetermined platforms, kickstart packages on the centralized server 310 may be modified to extend the provisioning capabilities to support additional platforms (e.g., PPC, System z, etc.). Details of one embodiment of the centralized server 310 and one embodiment of the method to extend the provisioning capabilities of the centralized server 310 have been described above.

Referring back to FIG. 3, the internal network 303 includes a local area network (LAN) protected from unauthorized access. For instance, a firewall may be employed at a gateway or proxy of the LAN to prevent unauthorized access to the LAN. Through the secured connection 330, the centralized server 310 within the internal network 303 may access the external server 370 external to the internal network 303. For example, the external server 370 may host a website of the software vendor and the centralized server 310 may establish the secured connection 330 to the website using one or more Internet security protocol (e.g., secure socket layer (SSL), secure shell (SSH), transport layer security (TLS), etc.). Thus, the centralized server 310 may securely retrieve or download various contents from the external server 370, such as contents that are available only by purchase and/or license (e.g., metadata of an operating system, such as Red Hat Enterprise Linux provided by Red Hat, Inc. of Raleigh, N.C., information on provisioning, executables of client applications, etc.). The contents retrieved are stored locally within the customer's internal network 303. In one embodiment, the contents retrieved are stored in a storage device internal to the centralized server 310. Alternatively, the contents retrieved may be stored in the database 312 coupled to the centralized server 310 within the internal network 303. Alternatively, the contents retrieved may be stored in a Network-Attached Storage (NAS) device. After downloading the contents from the external server 370, the centralized server 310 may terminate the secure connection 330 such that no talk back to the external server 370 is allowed. As such, the above approach allows the customer to take the customer's system off the external network (e.g., the Internet), and hence, providing more optimization, flexibility, and control of the system to the customer.

The centralized server 310 may synchronize with the external server 370 by checking with the external server 370 for updates and/or changes to the contents retrieved previously. Such synchronization may be performed periodically and/or in response to user requests. Alternatively, the external server 370 may notify the centralized server 310 when there are changes and/or updates to the contents previously provided to the centralized server 310. When there is a change to an item previously retrieved, the centralized server 310 may retrieve the change from the external server 370 and then update a copy of the item on the centralized server 310 accordingly, or the centralized server 310 may simply retrieve an updated version of the item to replace the previously retrieved version. In some embodiments, synchronization is performed via one or more channels within the secured connection 330 between the centralized server 310 and the external server 370. A channel as used herein refers to a collection of software packages organized into a logical grouping. For example, the set of packages that make up an operating system is organized into a channel in some embodiments. Different types of contents may be associated with different channels such that the centralized server 310 may choose to synchronize a subset of the channels as needed. For example, information related to provisioning virtual hosts and virtual guests may be associated with a Tool channel.

Alternatively, the centralized server 310 may synchronize with the external server 370 via portable computer-readable storage media, such as CDs, DVDs, flash memory cards with USB connectors, etc. When there is a change to content previously provided to the centralized server 310, the change to the content or an updated version of the content may be stored onto the computer-readable storage media from the external server 370. Then the computer-readable storage media may be delivered to the customer, who would provide the computer-readable storage media to the centralized server 310. By providing the computer-readable storage media to the centralized server 310, the centralized server 310 obtains the updated content, such as the metadata and information, from the computer-readable storage media and subsequently, uses the updated content to manage the computing machines 320A-320C as well as the virtual hosts and virtual guests provisioned on the computing machines 320A-320C.

Figure 4:
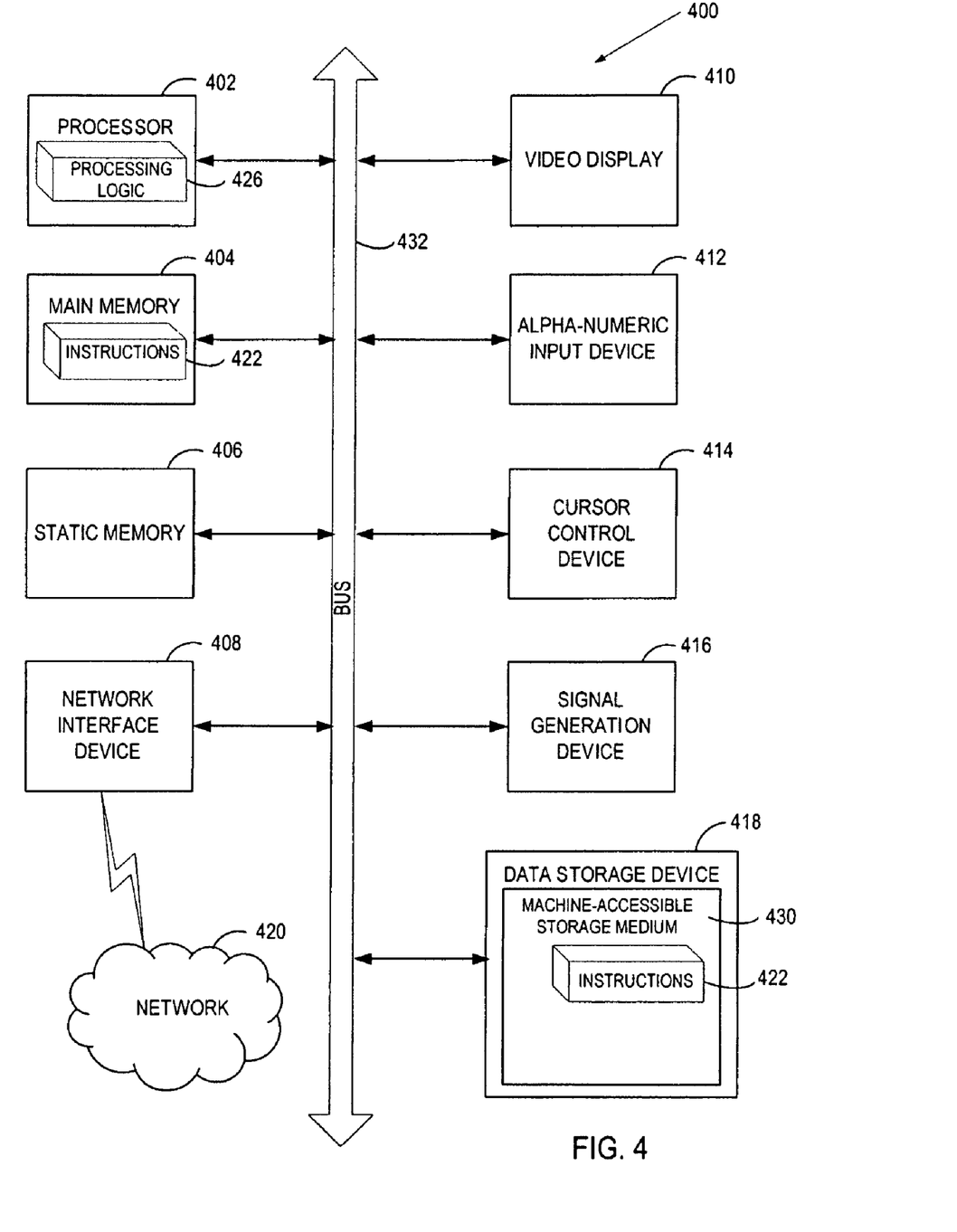
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium or a computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of enhanced capabilities in provisioning on computing machines in a networked system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
extending provisioning capabilities of a centralized server deployed by a software vendor to an internal network of a customer of the software vendor to support an additional type of platform, said extending provisioning capabilities comprising
downloading a plurality of kickstart files associated with the additional type of platform from the software vendor to the centralized server, the plurality of kickstart files comprising a kickstart configuration file, a kickstart data file and a kickstart operation file; and
provisioning on a computing machine coupled to the centralized server within the internal network based on a type of a platform of the computing machine using one or more of the plurality of kickstart files.

2. The method of claim 1, wherein the type of the additional type of platform is Power Personal Computer (PPC).

3. The method of claim 1, wherein the additional type of platform is System z.

4. The method of claim 1, further comprising:
modifying a kickstart script on the centralized server to add bootloader configuration options specific to the additional type of platform; and
allowing users to activate one or more of the bootloader configuration options in order to configure a bootloader for the additional type of platform on the centralized server.

5. The method of claim 1, further comprising:
configuring a bootloader for the additional type of platform on the centralized server in response to a user request; and
using the bootloader to provision on the computing machine if the platform on the computing machine is of the additional type.

6. An apparatus comprising:
a processing module to extend provisioning capabilities of a centralized server deployed by a software vendor to an internal network of a customer of the software vendor to support an additional type of platform by
downloading a plurality of kickstart files associated with the additional type of platform from the software vendor to the centralized server, the plurality of kickstart files comprising a kickstart configuration file, a kickstart data file and a kickstart operation file; and
a provisioning module to provision on a computing machine coupled to the centralized server within the internal network based on a type of a platform of the computing machine using one or more of the plurality of kickstart files.

7. The apparatus of claim 6, wherein the additional type of platform is Power Personal Computer (PPC).

8. The apparatus of claim 6, wherein the additional type of platform is System z.

9. The apparatus of claim 6, further comprising:
a storage device to store a kickstart script, wherein the processing module modifies the kickstart script to add bootloader configuration options specific to the additional type of platform, wherein the kickstart script, when executed by the provisioning module, allows users to activate one or more of the bootloader configuration options in order to configure a bootloader for the additional type of platform on the centralized server.

10. The apparatus of claim 6, wherein the processing module configures a bootloader for the additional type of platform on the centralized server in response to a user request and uses the bootloader to provision on the computing machine if the platform on the computing machine is of the additional type.

11. The apparatus of claim 6, further comprising:
a user interface module to generate a user interface to allow a user to input the type of the platform of the computing machine to the centralized server.

12. A system comprising the apparatus of claim 6, further comprising:
the centralized server, wherein the provisioning module and the processing module are implemented within the centralized server.

13. A computer-readable storage medium embodying instructions that, when executed by a processor, will cause the processor to perform operations comprising:
extending provisioning capabilities of a centralized server deployed by a software vendor to an internal network of a customer of the software vendor to support an additional type of platform, said extending provisioning capabilities comprising
downloading a plurality of kickstart files associated with the additional type of platform from the software vendor to the centralized server, the plurality of kickstart files comprising a kickstart configuration file, a kickstart data file and a kickstart operation file; and
provisioning on a computing machine coupled to the centralized server within the internal network based on a type of a platform of the computing machine using one or more of the plurality of kickstart files.

14. The computer-readable storage medium of claim 13, wherein the type of the additional type of platform is Power Personal Computer (PPC).

15. The computer-readable storage medium of claim 13, wherein the additional type of platform is System z.

16. The computer-readable storage medium of claim 13, wherein the operations further comprise:
modifying a kickstart script on the centralized server to add bootloader configuration options specific to the additional type of platform; and
allowing users to activate one or more of the bootloader configuration options in order to configure a bootloader for the additional type of platform on the centralized server.

17. The computer-readable storage medium of claim 13, wherein the operations further comprise:
configuring a bootloader for the additional type of platform on the centralized server in response to a user request; and
using the bootloader to provision on the computing machine if the platform on the computing machine is of the additional type.

* * * * *